United States Patent [19]

Yousuke

[11] Patent Number: 5,116,176
[45] Date of Patent: May 26, 1992

[54] EXPANSION ANCHOR

[75] Inventor: Yoshino Yousuke, Kawagoe, Japan

[73] Assignee: Yoshino Seiki Inc., Kawagoe, Japan

[21] Appl. No.: 717,816

[22] Filed: Jun. 19, 1991

[30] Foreign Applications Priority Data

Jan. 20, 1990 [JP] Japan .................................. 2-16 1996

[51] Int. Cl.⁵ .............................................. F16B 13/06
[52] U.S. Cl. .................................... 411/60; 411/33; 411/61; 411/65
[58] Field of Search ................... 411/32, 33, 44, 57, 411/60, 61, 64–67

[56] References Cited

U.S. PATENT DOCUMENTS

| 2,400,142 | 5/1946 | Tinnerman | 411/61 |
| 2,804,797 | 9/1957 | Seely | 411/61 |
| 4,235,151 | 11/1980 | Udert et al. | 411/60 |
| 4,917,552 | 4/1990 | Crawford | 411/32 |

FOREIGN PATENT DOCUMENTS

| 3622937 | 1/1988 | Fed. Rep. of Germany | 411/60 |
| 111449 | 9/1967 | Norway | 411/61 |
| 2193550 | 2/1988 | United Kingdom | 411/60 |

Primary Examiner—Neill R. Wilson
Attorney, Agent, or Firm—Wenderoth, Lind & Ponack

[57] ABSTRACT

An expansion anchor capable of being expanded by thrusting a lock plug into a contacted portion to spread a clamp member having acutely angular peripheral edges. When the anchor is expanded within a hole in a rigid material such as concrete, the angular edges of the clamp member bite into the rigid material, so that the anchor is no longer removable from the rigid material.

10 Claims, 5 Drawing Sheets

EXPANSION ANCHOR

BACKGROUND OF THE INVENTION

1. Field of the Invention

This invention relates to an expansion anchor capable of being expanded within a hole bored in a rigid material such as a stone and concrete by thrusting a lock plug into the inside of the anchor so as to fasten something else onto it or reinforce the rigid material.

2. Description of the Prior Art

There have been so far a variety of expansion anchors capable of being secured onto a rigid material such as concrete. One expansion anchor which is widely used is shown in FIG. 1 as one example. In principle, the anchor of this type comprises a cylindrical anchor body 1, a wedge plug 5 which is forced into the inside of the anchor body 1, and a threaded bolt 3 having a clamp nut 7 at one end portion thereof and brought into threaded connection with the wedge plug 5 at the other end portion. After inserting the anchor body 1 in a fitting hole bored in a concrete material or other rigid materials, the wedge plug 5 is forced into the anchor body 1 by turning the thread bolt 3 to thereby expand the anchor body. Thus, the anchor is fixedly secured within the concrete material in a non-removable state.

The anchor body of this expansion anchor is generally made of relatively soft material and has longitudinal expanding slits in its leading end portion so as to facilitate expansion of the anchor body by forcibly thrusting the wedge plug 5 into the anchor body 1. The anchor body thus expanded inside the hole in the concrete material comes into frictional contact with the inner surface of the concrete hole to be thereby kept in its non-removable state. In order to heighten the non-removable effect of the anchor, the anchor body is provided on its outer circumferential surface with checking steps 9 as illustrated. To further improve the non-removable effect of the anchor expanded within the concrete hole, the degree of expansion of the anchor body must be increased sufficiently.

However, an anchor capable of being sufficiently expanded requires a markedly large thrusting force to be imparted to the wedge plug 5. Moreover, this anchor is disadvantageous in that the frictional clamping force brought about by the checking steps 9 formed in the outer circumferential surface thereof is not sufficient to steadily secure the anchor in the concrete material. Also, the clamping force depends upon the diameter of the hole bored in the concrete material or the like relative to the outer diameter of the anchor body, and it is difficult to form the hole with a suitable diameter.

SUMMARY OF THE INVENTION

An object of the present invention is to provide an excellent and reliable expansion anchor which can be sufficiently expanded and produce a large clamping force merely by thrusting a lock plug there into with a relatively small force.

To attain this object the expansion anchor according to this invention comprises a cylindrical anchor body having a contracted portion with at least one circumferential retaining groove, at least one clamp member having a peripheral angular edges and fitted into the retaining groove, and a lock plug having a diameter somewhat larger than the inner diameter of the contracted portion of the anchor body and being of slidably contained within the anchor body.

Upon inserting the expansion anchor into a fitting hole bored in a rigid object such as a stone or concrete base, the lock plug assembled inside the anchor body is thrust inside the contracted portion to thereby expand the contracted portion. The contracted portion thus expanded causes the clamp member fitted to the circumferential retaining groove to be spread and increase in diameter and bite into the inner surface of the hole in the rigid object. Owing to the acutely angular edges on the peripheral portion of the clamp member, the anchor expanded in the hole can no longer be withdrawn from the hole and is reliably fixed in the rigid object.

BRIEF DESCRIPTION OF THE DRAWINGS

The other objects and features of the present invention will now be explained in detail with reference to the accompanying drawings, wherein.

DESCRIPTION OF THE PREFERRED EMBODIMENTS

Figure 1:
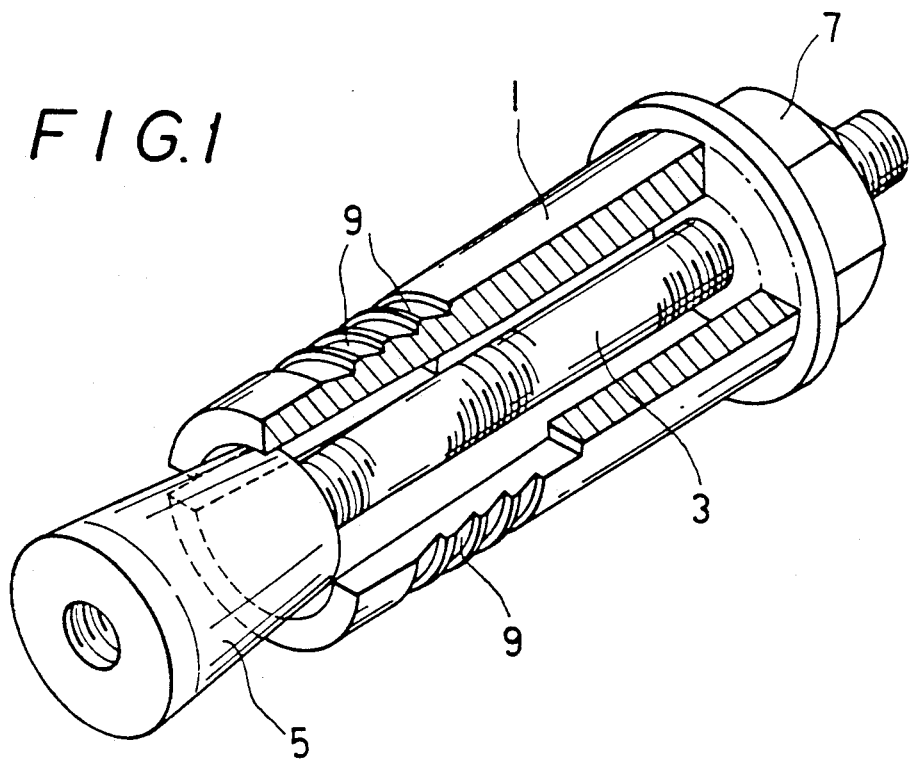
FIG. 1 is a partially sectioned perspective view showing one example of conventional expansion anchors.
Figure 2:
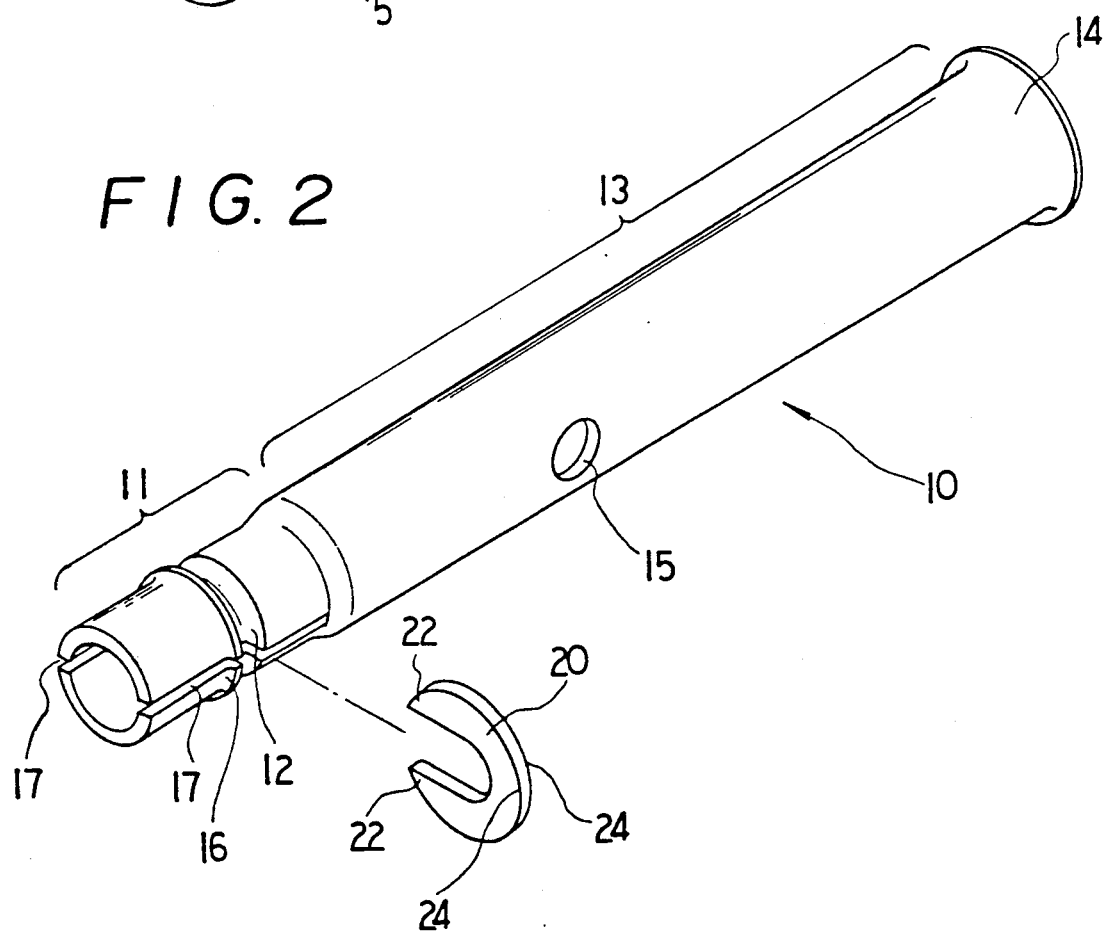
FIG. 2 is a perspective view showing one embodiment and an expansion anchor according to this invention.
Figure 3:
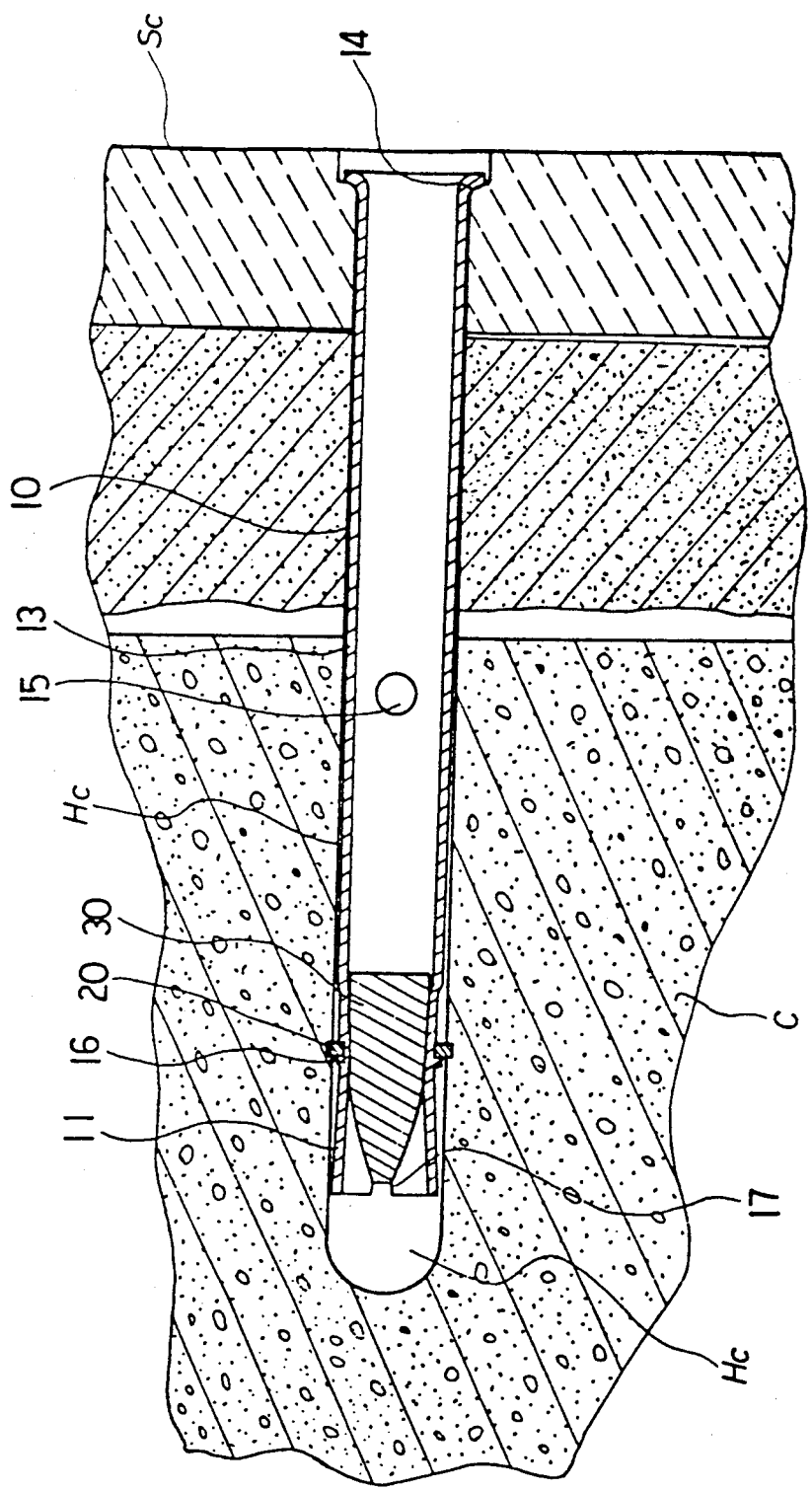
FIG. 3 is a sectioned side view of the expansion anchor of FIG. 2.
Figure 4:
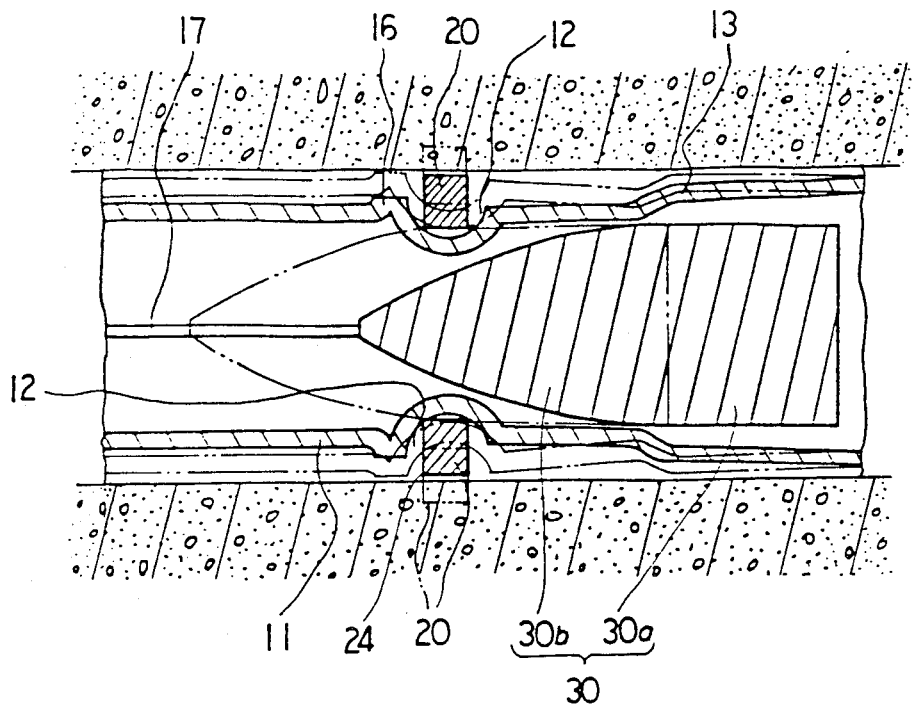
FIG. 4 is an enlarged view in section of FIG. 2.

FIGS. 2 through 5 show one preferred embodiment according to his invention. The illustrated expansion anchor of this invention comprises a cylindrical anchor body 10 having a contracted portion 11 which is provided in the circumferential outer surface thereof with a circumferential retaining groove 12, a clamp member 20 fitted into the retaining groove 12 formed in the contracted portion 11, and a lock plug 30 contained within the anchor body 10.

The contracted portion 11 may be formed by reducing the dimension of the leading end portion of the anchor body 10 so that the anchor body is composed of a large diameter portion (trunk portion 13) and a small diameter portion (contracted portion 11). The lock plug 30 has a diameter smaller than the inner diameter of the aforementioned trunk portion 13 of the anchor body 10 and smaller than the inner diameter of the contracted portion 11, and is placed inside the anchor body 10 so as to slidable in the lengthwise direction.

The anchor body 10 can be made not only of tough material such as stainless steel or other metallic materials of various kinds, but also plastic materials having moderate flexibility together with rigidity and strength. The trunk portion 13 of the anchor body 10 is provided on its rear end with a flange 14 and is gradually reduced in diameter from the flange 14 toward the contracted portion 11. In the trunk portion 13, there are formed side openings 15 for allowing fluid such as a sealing agent as described later to flow out therethrough, although they are not indispensable constituents of this invention.

Figure 5:
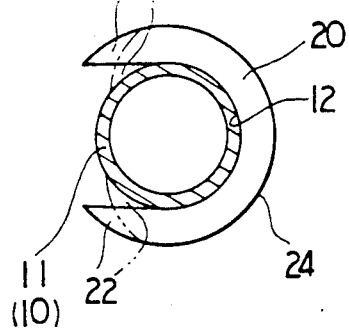
FIG. 5 is a front view of a clamp member in the anchor of FIG. 2.

The clamp member 20 to be fitted into the retaining groove 12 in the contracted portion 11 is formed in a generally U- or C-shape as shown in FIG. 5. The clamp member 20 has an inner diameter nearly equal to the diameter of the retaining groove 12 formed in the contracted portion 11, and an outer diameter equal to or somewhat smaller than the trunk portion 13 other than the flange 14. If the outer diameter of the clamp member 20 is made smaller than the outer diameter of the trunk portion 13, the difference in outer radius between the trunk portion 13 and the clamp member 20 should be made sufficiently larger than the thickness of the contracted portion 11.

The clamp member 20 may be made by, for instance, punching a metal plate, or bending a rod material into a generally U-shape. It is however required to form acutely angular edges 24 on the circumferential periphery of the clamp member. The clamp member 20 is preferably secured in the retaining groove 12 by caulking as indicated by the imaginary line in FIG. 5. Otherwise, the clamp member may be made of a spring ring which is forcibly fitted into the retaining groove 12.

A dike portion 16 formed along the retaining groove 12 has an effect of preventing the clamp member 20 from deviating from the retaining groove. In the contracted portion 11, there are formed expanding slits 17 extending in the longitudinal direction of the anchor body.

The lock plug 30 in this embodiment is composed of a rear half part 30a having a smaller diameter than the inner diameter of the contracted portion 11, but larger than the inner diameter of said retaining groove 12, and a front half part 30b having a tapered section like a wedge or bullet. To be more specific, the lock plug 30 should necessarily be designed so that the total of the radius of the rear half part 30a, the thickness of the contracted portion 11 at the retaining groove 12 and the radial width of the clamp 20 (difference between the outer and inner radii of the clamp member) is larger than the radius of the maximum diameter of the anchor body 10 other than the flange 14.

Now the manner in which the anchor constructed as above is secured inside a hole Hc in a concrete base C shown in FIG. 6 will be described below.

At the outset, the anchor is inserted from the leading end of the contracted portion 11 into the hole Hc having the inner diameter nearly equal to the outer diameter of the anchor body 10 until the flange 14 of the anchor comes into contact with or is slightly shaped from the surface Sc of the concrete base C. Then, the lock plug 30 in the anchor body 10 is thrust toward the contracted portion 11 by using a push rod or other similar tool, consequently to expand the contracted portion 11 by engagement with the retaining groove 12 as shown in FIG. 6 and spread the clamp member 20 radially. The clamp member 20 thus spread causes the angular edges 24 to bits into the inner wall surface of the hole Hc in the concrete base C as illustrated.

The lock plug 30 is easily moved into the contracted portion 11 with a relatively small force to expand the contracted portion 11 owing to the expanding slits 17. Besides, the contracted portion 11 can be expanded without imparting a large thrusting force to the lock plug 30, because only the clamp member 20 is spread substantially. The clamp member having the acutely angular edges firmly bites into the inner wall surface of the hole Hc so as to steadily secure the anchor in position in the concrete base. The anchor thus secured is no longer removable from the concrete hole even if subjected to an intense drawing force.

The excellent performance of the expansion anchor according to this invention having the structure described above was confirmed experimentally. In the experiment which was actually conducted, an expansion anchor of stainless steel having a length of 70 mm, an outer diameter of 6 mm, and a thickness of 0.5 mm was used with the clamp member made of a stainless steel plate of 1 mm in thickness, which is designed to have a variation of about 0.25 mm. This anchor showed a tensile strength of 300 kg. It was found from the results of the experiment that it is desirable to provide a variation of expansion of 0.15 mm to 0.3 mm of the clamp member.

The expansion anchor which is provided in its contracted portion 11 with the retaining groove 12 to obtain a sufficient variation of the expansion of the clamp member was used in the above experiment. However, even the anchor having no contracted portion was found to the nearly equal in ability to the above-described anchor with the contracted portion 11.

Figure 6:
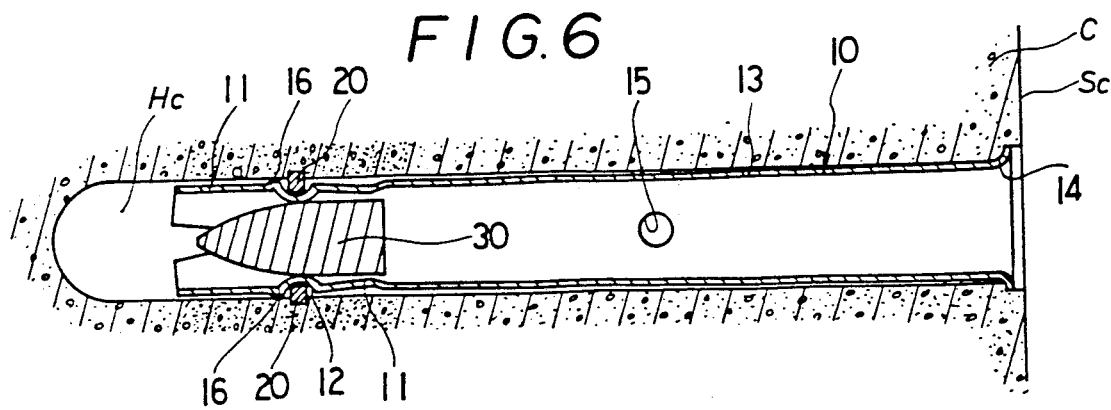
FIG. 6 is a sectioned side view of the expansion anchor of FIG. 2 in the state of being engaged by a lock plug inside a hole in a rigid material.

To secure the anchor expanded inside the hole in the concrete base ore steadily, the interior of the anchor body 10 may be filled with a sealing agent such as epoxy resin in the spread state of the anchor body as shown in FIG. 6. The sealing agent filled into the inner hollow of the anchor body flows out through the side openings 15 bored in the anchor body 10 and permeates the entire inner surface of the concrete hole Hc. When the sealing agent filled into the concrete hole and the inner hollow of the anchor body solidifies, the anchor is fixedly secured within the hole in the concrete base in the non-removable state as if the anchor and the concrete base were united integrally.

Figure 7:
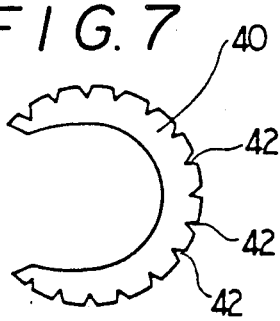
FIG. 7 is a front view of a clamp member used in another embodiment.

Shown in FIG. 7 is a clamp member 40 provided in its peripheral portion with notches 42 to further heighten the effect of biting into the concrete base.

Figure 8:
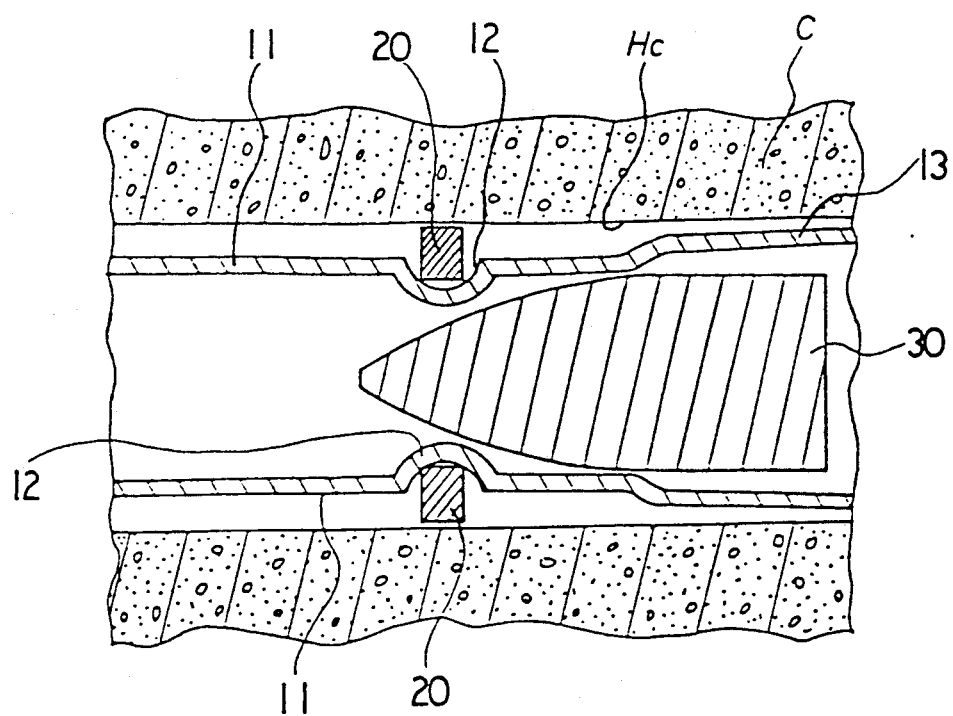
FIG. 8 is a side view in section showing the principal portion of still another embodiment according to this invention.

As shown in FIG. 8, the retaining groove 12 in the contracted portion 11 at the leading end portion of the anchor body 10 may be formed deeply. According to this embodiment, the dike portion 16 used in the foregoing embodiment can be omitted from the contracted portion 11 of the anchor body. Further, although expanding slits 17 like those in the contracted portion 11 in the first embodiment are not present in this embodiment, the contracted portion 11 can be expanded with a small force if the anchor body 10 is made of a flexible material. In FIG. 8, the elements indicated by like reference numerals as those of the first embodiment noted above have analogous structure sand functions to those of the first embodiment.

Figure 9:
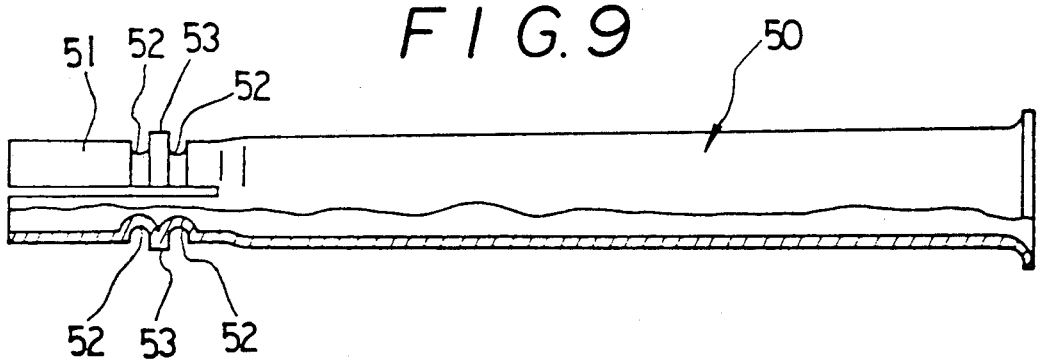
FIG. 9 is a partially sectioned side view of yet another embodiment of this invention.

Also, though the anchor body 10 and clamp member 20 are separate in the first embodiment, these elements are formed in one body as illustrated in FIG. 9. The clamp member 53 integrally connected to the anchor body 50 can be made coincidentally with the contracted portion 51 by forming circumferential grooves 52 by drawing, for example.

Figure 10:
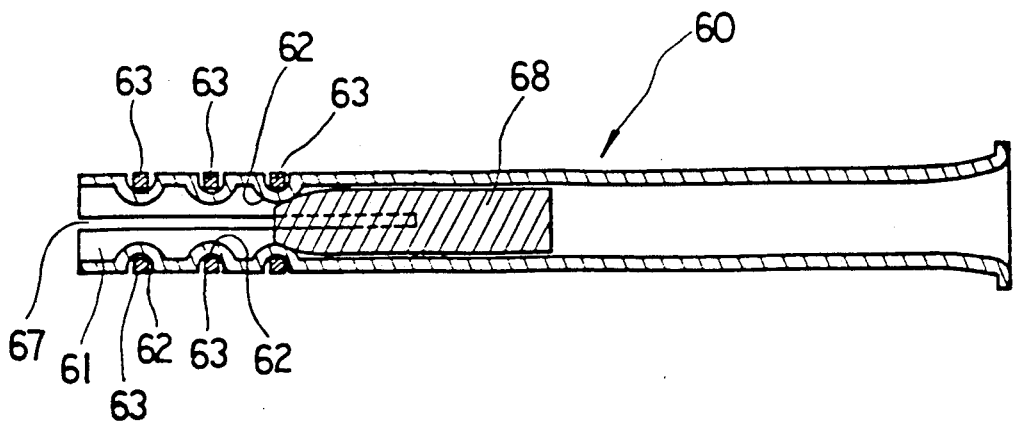
FIG. 10 is a sectioned side view of a further embodiment of this invention.
Figure 11:
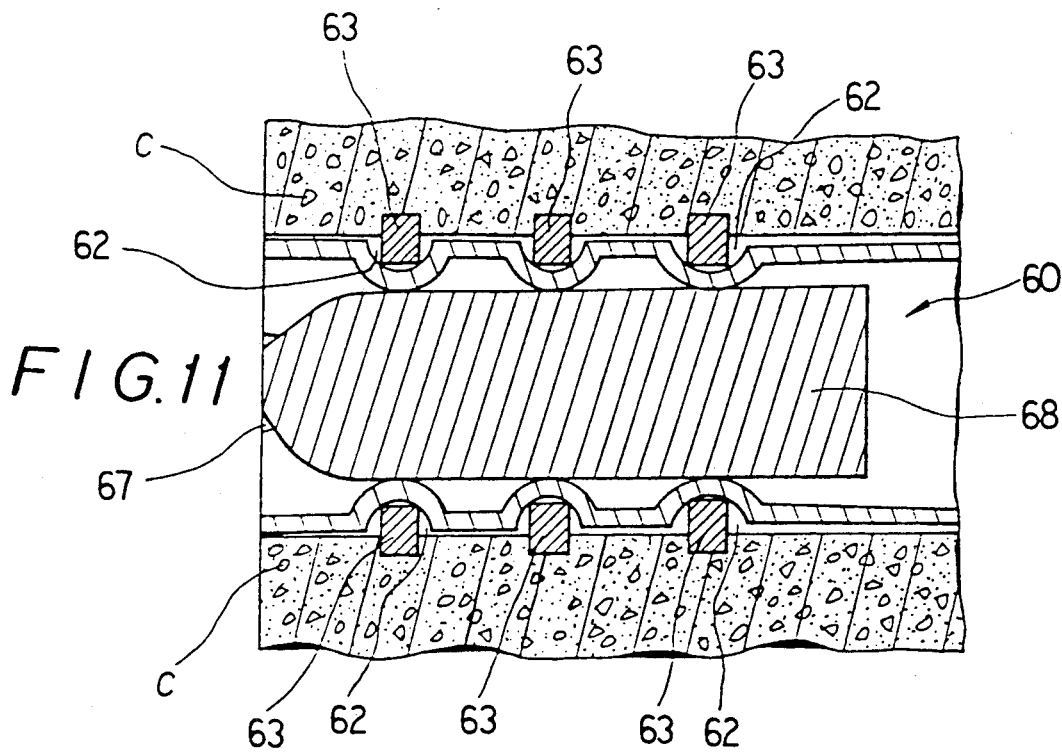
FIG. 11 is an enlarged view in section showing the principal portion of FIG. 10.

Another embodiment shown in FIGS. 10 and 11 provides an expansion anchor comprising an anchor body 60 having a contracted portion 61 with a plurality of retaining grooves 62. There are a plurality of clamp members 63 fitted into the retaining grooves 62. Similarly to the above-described embodiments, the contracted portion 61 is provided with longitudinal expanding slits 67, and a lock plug 68 is inserted inside the anchor body 60 so as to be thrust into the contracted portion 61 to spread the clamp members 63. This anchor has an effect of establishing engagement with a rigid object such as a concrete base with great strength.

The strength of the expansion anchor of FIG. 10 with respect to a pull-out force exerted thereon which was obtained experimentally is shown in TABLE 1 below. The experiment was conducted by using an Amsler's tensile test machine. In the experiment there were used a concrete base of 240 kg/mm² which is commonly used as a building material, and an anchor according to this invention having an outer diameter of 6 mm, a thickness of 0.8 mm and a length of 55 mm.

TABLE 1

| Anchor No | Maximum Load (kg) | Pull-out Rate (mm/min) | Resultant State |
|---|---|---|---|
| #1 | 522 | 50 | Concrete broken |
| #2 | 741 | 50 | Anchor broken |
| #3 | 528 | 50 | Concrete broken |
| #4 | 732 | 50 | |
| #5 | 552 | 25 | |
| #6 | 552 | 25 | |
| #7 | 558 | 25 | |
| #8 | 567 | 25 | |
| #9 | 537 | 25 | |
| #10 | 529 | 25 | |

Figure 12:
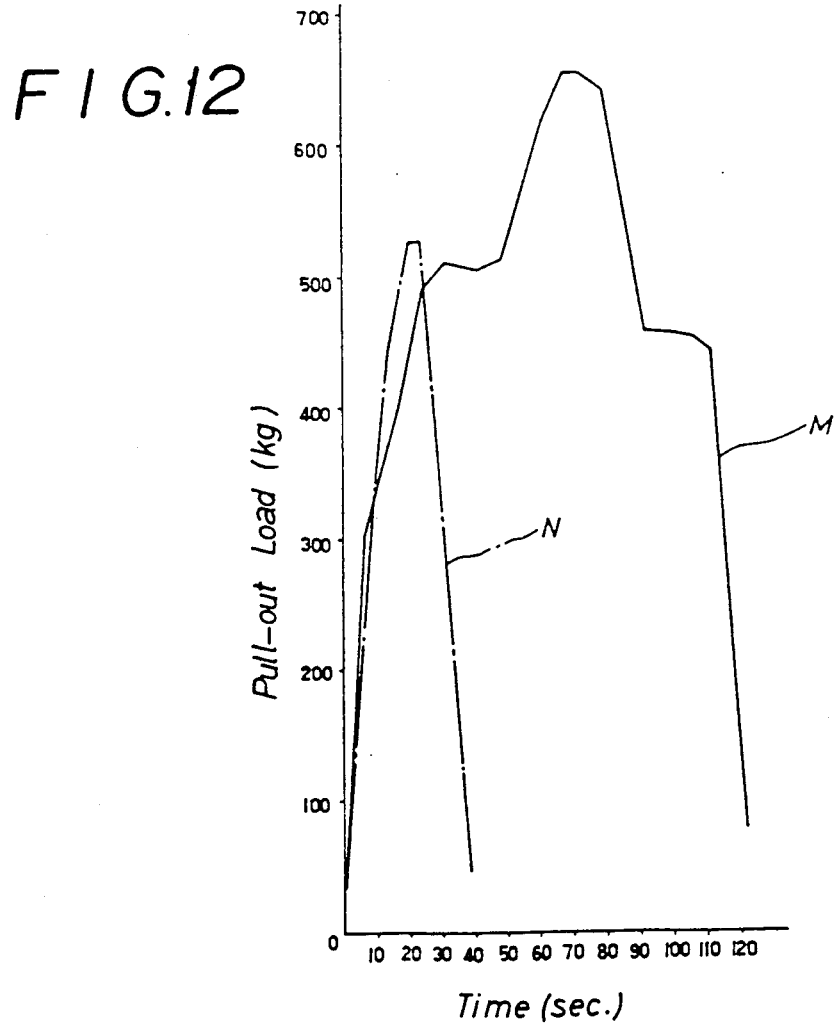
FIG. 12 is a graph representing the result of the comparative tests which were conducted to provide the performance of the anchor according to this invention.

FIG. 12 shows the tensile characteristic of the expansion anchor (M) of this invention as shown in FIG. 10, compared with a conventional expansion anchor (N) having an outer diameter of 6 mm, a thickness of 0.7 mm and a lengthy of 45 mm. As is evident from the illustrated graph, the expansion anchor (M) according to this invention has achieved the effect of vigorously remaining secured in the concrete base for a relatively long time due to the clamp members, compared with the conventional anchor (N) which was broken away from the concrete base before long.

As described above, the expansion anchor according to the present invention can be sufficiently expanded and produce a large clamping force from a relatively small force of thrusting the lock plug into the contracted portion by means of the clamp member having the acutely angular edges.

As can be readily appreciated, it is possible to deviate from the above embodiments of the present invention and, as will be readily understood by those skilled in this art, the invention is capable of many modifications and improvements within the scope and spirit thereof. Accordingly, it will be understood that the invention is not to be limited by these specific embodiments, but only by the scope and spirit of the appended claims.

What is claimed is:

1. An expansion anchor comprising:
   a hollow cylindrical anchor body having an inner diameter and an outer diameter and having a wall portion thereof deformed into the interior of said anchor body to form at least one circumferential retaining groove which at the deepest portion thereof has an inner diameter and an outer diameter respectively smaller than the inner and outer diameters of said anchor body;
   at least one clamp member in the form of a generally U- or C-shaped plate having peripheral angular edges and fitted into said retaining groove so as to extend radially thereof, said clamp member having an inner diameter substantially equal to said outer diameter of said retaining groove and an outer diameter no greater than a size substantially equal to than said outer diameter of said anchor body; and
   a lock plug having a diameter larger than said inner diameter of said retaining groove and less than the inner diameter of said anchor body for being slidably contained in said anchor body.

2. The anchor according to claim 1 wherein said trunk portion is provided on its rear end with a flange and gradually reduced in diameter from said flange toward said contracted portion.

3. The anchor according to claim 1 wherein said trunk portion has at least one side opening.

4. The anchor according to claim 1 wherein said lock plug comprises a rear half part having a larger diameter than the inner diameter of said retaining groove, and a front half part having a streamline section.

5. The anchor according to claim 1 wherein said clamp member has notches in its outer peripheral portion.

6. The anchor according to claim 1 wherein said anchor body and clamp member are separate members.

7. An expansion anchor as claimed in claim 1 in which the difference between the outer diameter of said trunk portion and the outer diameter of said clamp member is less than the difference between the inner diameter of said retaining groove and the outer diameter of said lock plug.

8. An expansion anchor as claimed in claim 1 in which said anchor body has a trunk portion and a contracted portion each having an inner and outer diameter, the inner and outer diameters of said contracted portion being less than the inner and outer diameters of said trunk portion and said retaining groove being in said contracted portion and having said inner and outer diameters less than the inner and outer diameters of said contracted portion, and said lock plug having an outer diameter less than the inner diameter of said contracted portion.

9. The anchor according to claim 8 wherein said contracted portion has at least one expanding slit extending longitudinally.

10. An expansion anchor comprising:
    a hollow cylindrical anchor body having an inner diameter and an outer diameter and having a wall portion thereof deformed into the interior of said anchor body to form at least one circumferential retaining groove which at the deepest portion thereof has an inner diameter and an outer diameter respectively smaller than the inner and outer diameters of said anchor body;
    at least one clamp member in the form of an annular plate-like shape extending radially of said retaining groover and having peripheral angular edges and integrally formed with the material of said retaining groove, said clamp member having an outer diameter no greater than a size substantially equal to a size no greater than said outer diameter of said anchor body; and
    a lock plug having a diameter larger than said inner diameter of said retaining groove and less than the inner diameter of said anchor body for being slidably contained in said anchor body.

* * * * *

UNITED STATES PATENT AND TRADEMARK OFFICE
CERTIFICATE OF CORRECTION

PATENT NO. : 5,116,176
DATED : May 26, 1992
INVENTOR(S) : Yoshino Yousuke

It is certified that error appears in the above-identified patent and that said Letters Patent is hereby corrected as shown below:

On the Title page, under item [19],

"Yousuke" should be --Yoshino--;

On the Title page in item [75],

"Yoshino Yousuke" should be --Yousuke Yoshino--.

Signed and Sealed this

Eighteenth Day of August, 1992

Attest:

DOUGLAS B. COMER

Attesting Officer

Acting Commissioner of Patents and Trademarks